(12) United States Patent
Dirisio

(10) Patent No.: US 6,832,043 B2
(45) Date of Patent: Dec. 14, 2004

(54) CAMERA LENS MODULE HAVING RECYCLABLE LENS BARREL CAP

(75) Inventor: Anthony Dirisio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 4 days.

(21) Appl. No.: 10/324,966

(22) Filed: Dec. 20, 2002

(65) Prior Publication Data

US 2004/0120701 A1 Jun. 24, 2004

(51) Int. Cl.$^7$ ............................................... G03B 17/02
(52) U.S. Cl. ........................................ 396/6; 396/535
(58) Field of Search ..................... 396/6, 535

(56) References Cited

U.S. PATENT DOCUMENTS

| | | |
|---|---|---|
| 4,045,117 A | 8/1977 | Lerner |
| 5,146,256 A | 9/1992 | Frosig et al. |
| 5,327,188 A | 7/1994 | Kohmoto |
| 5,400,098 A | 3/1995 | Rydelek |
| 5,555,062 A | 9/1996 | Pearson et al. |
| 5,974,264 A | 10/1999 | Manabe et al. |
| 6,104,887 A | 8/2000 | Hamasaki et al. |
| 6,449,430 B1 * | 9/2002 | Tasaka et al. ............... 396/6 |
| 6,466,740 B1 * | 10/2002 | Yoshida et al. ............. 396/6 |
| 6,477,325 B1 * | 11/2002 | Tobioka .................... 396/6 |

* cited by examiner

*Primary Examiner*—David M. Gray
(74) *Attorney, Agent, or Firm*—Robert Luke Walker

(57) ABSTRACT

A camera frame assembly has an extendable lens module having a lens base, a traveler, a front lens element, and a barrel cap. The lens base defines an optical axis. The traveler moves along the optical axis between first and second positions, relative to the lens base. The traveler has a front lens seat. A front lens element is disposed in the front lens seat. A barrel cap is snapped on the traveler. The barrel cap retains the front lens element in the traveler in alignment with the optical axis. The barrel cap can be snapped off for replacement by a new or renewed barrel cap. When the barrel cap is off, the front lens element is released and can be replaced or can be held in place for reuse.

10 Claims, 10 Drawing Sheets

CAMERA LENS MODULE HAVING RECYCLABLE LENS BARREL CAP

CROSS REFERENCE TO RELATED APPLICATIONS

Reference is made to commonly assigned, co-pending U.S. patent application Ser. No. 10/264,757, entitled: MULTIPLE POSITION LENS BARREL HAVING CAM CYLINDER WITH COMMONLY BIASED FIRST AND SECOND LENS CARRIERS, filed 4 Oct. 2002 in the name of Anthony Dirisio; Ser. No. 10/324,488, entitled: CAMERA FRAME ASSEMBLY HAVING FOUR-BAR LINKAGE SHUTTER ACTUATOR, filed 20 Dec. 2002 in the name of Anthony Dirisio; Ser. No. 10/327,503, entitled EXTENDABLE LENS CAMERA HAVING MECHANICAL SHUTTER BLOCKING IN INTERMEDIATE LENS POSITION, filed 20 Dec. 2002 in the name of Anthony Dirisio; Ser. No. 10/325,507, entitled: CAMERA FRAME ASSEMBLY HAVING SHUTTER THAT SLIDES FORWARD AND BACK WITH ZOOM LENS, filed 20 Dec. 2002 in the name of Anthony Dirisio, David J. Cornell; Ser. No. 10/325,553, entitled: CAMERA FRAME ASSEMBLY HAVING SHUTTER ACTUATOR WITH TELESCOPING STRIKER AND METHOD, filed 20 Dec. 2002 in the name of David J. Cornell; Ser. No. 10,326,450, entitled: CAMERA FRAME ASSEMBLY HAVING INDEPENDENTLY BACK-PIVOTING DRIVE HUB FOR IMPACT SHUTTER, filed 20 Dec. 2002 in the name of Anthony Dirisio.

FIELD OF THE INVENTION

The invention relates to photography and photographic cameras and equipment and more particularly relates to a recyclable lens barrel cap.

BACKGROUND OF THE INVENTION

One-time-use cameras are subject to rough usage, particularly during the initial stages of recycling following removal of exposed film. In view of this, it is common practice for one-time-use camera manufacturers to replace camera covers each time a camera is recycled, while retaining all or many of the internal camera parts. The replaced covers are reused as feedstock in the manufacture of new parts.

U.S. Pat. No. 5,555,062 discloses a one-time use camera, in which a lens element of a two-element taking lens is held against the frame of a one-time-use camera by a front cover of the camera. The taking lens provides a fixed focus. U.S. Pat. No. 5,400,098 discloses a camera, in which a single element taking lens is held against the frame of the camera by a combined lens holder and cassette chamber cover.

U.S. Pat. No. 6,104,887 discloses a detachable lens hood. U.S. Pat. No. 5,974,264 discloses a cover that protects the side wall of a lens barrel. The cover attaches to the front cover of a camera. These articles do not protect the end of a lens barrel. U.S. Pat. No. 5,327,188 discloses an adapter that attaches to a lens barrel. This adapter appears to be protective, but it is a complex assembly.

It would thus be desirable to provide ease of outer lens element replacement and replacement of cosmetic parts, in a camera having an extendable lens barrel.

SUMMARY OF THE INVENTION

The invention is defined by the claims. The invention, in broader aspects, provides a camera frame assembly that has an extendable lens module having a lens base, a traveler, a front lens element, and a barrel cap. The lens base defines an optical axis. The traveler moves along the optical axis between first and second positions, relative to the lens base. The traveler has a front lens seat. A front lens element is disposed in the front lens seat. A barrel cap is snapped on the traveler. The barrel cap retains the front lens element in the traveler in alignment with the optical axis. The barrel cap can be snapped off for replacement by a new or renewed barrel cap. When the barrel cap is off, the front lens element is released and can be replaced or can be held in place for reuse.

It is an advantageous effect of the invention that an improved extendable lens module and camera are provided, which have easy outer lens element replacement and replacement of cosmetic parts.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
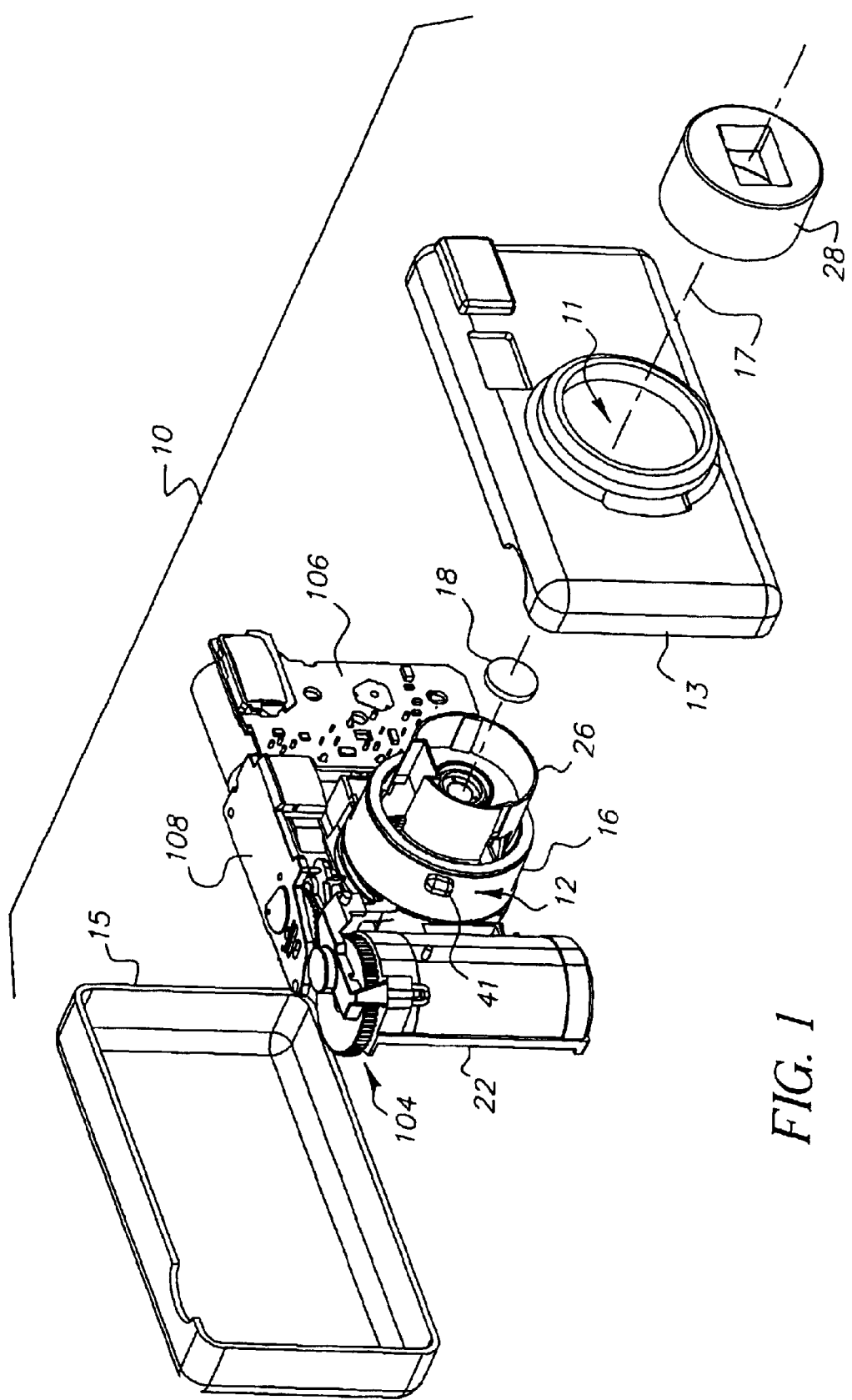
FIG. 1 is an exploded, front perspective view of an embodiment of the camera.

Referring initially to FIGS. 1–8, a camera frame assembly 10 has a zoom or focusable extending lens module 12 that has extendable lens barrel 14 joined to a lens base 16. The term "camera frame assembly" is used here to refer to a complete camera or an incomplete subunit of a camera that can be assembled with other parts to form a complete camera. The invention is particularly advantageous in relation to a camera frame assembly that is a complete or incomplete one-time use camera.

A taking lens optical system 20 includes a front lens element 18, located within the lens barrel 14, and a base lens element 21 (shown in FIGS. 5–6), located within the lens base 16. The taking lens 20 can optionally include one or more additional lens elements (not shown). The lens module 12 includes an extension-retraction mechanism and other parts that move the lens elements 18,21 relative to a capture plane (indicated by dashed line 100 in FIG. 2) within the frame 22. The extension-retraction mechanism can also move the lens elements 18,21 relative to each other. The nature of the extension-retraction mechanism is not critical. A particular extension-retraction mechanism is described in detail below. Other suitable mechanisms will be apparent to those of skill in the art.

Capture media (not shown) such as photographic film or an electronic image is held at the capture plane 100 for image capture. Features of suitable film or electronic capture units are well known to those of skill in the art.

Referring to FIGS. 1–8, the lens base 16 is mounted to a frame or chassis 22 that is held between front and rear covers 13,15 of the camera 10. Other camera features can be provided as is well known in the art. Referring to FIG. 1, the frame has a pair of opposed chambers 102, one can hold a film cartridge (not shown) and the other a film roll. A winding mechanism 104 advances film from the film roll, across a capture plane 100, and back into the film cartridge. A flash unit 106 can be included and synchronized with the shutter. A viewfinder-keeper plate 108 holds parts of the winding mechanism on the frame. The flash unit and other components are mounted to the frame 22 or held between the frame 22 and covers 13,15.

The lens module 12 extends outward from the frame 22, through an opening 11 in the front cover 13. The lens base 16 is mounted in a fixed position on the chassis 22. (The term "fixed" and like terms are used herein in the sense of a physical position or relationship that is in immobile and unchanging.)

The lens base 16 defines an optical axis 17 along which the elements of the taking lens system 20 are arranged. The lens barrel 14 is movable forward and backward (indicated by double-headed arrow 24) along the optical axis 17 between a fully extended position and a fully retracted position. The movement of the lens barrel 14 may or may not include rotation about the optical axis 17.

The lens base 16 has a mount 27, a holder 29, and a carrier 31. The mount 27 joins the lens module 12 to the frame 22 and is configured so meet the requirements of a particular frame design. The mount 27 is fixed to the frame 22. The manner in which the mount 27 and other parts are attached to the frame 22 is not critical. For example, the mount 27 can be attached by a friction fit or by hooks or can be otherwise fastened or adhered or bonded.

The mount 27 has a forward-facing cup 33 (see FIG. 5) that receives the holder 29. A central opening 35 of the mount 27 can be bordered by a masking structure 37 that blocks unwanted light, so reducing flare. The holder 29 is snapped, adhered, or otherwise fastened in fixed relation to the mount 27. The mount 27 and holder 29 are conveniently provided as two pieces, but can be provided as a single piece.

The lens barrel 14 is supported by holder 29 and the lens base 16. In addition to the front lens element 18, the lens barrel 14 includes a traveler 26 and a barrel cap 28. In the illustrated embodiment, the traveler 26 has a cylindrical outside wall 30 and a cross wall 32 extending in a direction perpendicular to the optical axis 17. The cross wall 32 includes an opening 34 and a lens seat 36 adjoining the opening. The front lens element 18 rests against the seat 36. The location of the shutter 23 is not critical. In the embodiments illustrated, the shutter 23 is located between the cross wall 32 and a backer 25 that is located in the traveler 26 and is joined to the outside wall 30. Suitable single leaf impact shutters and suitable shutters of other types are well known to those of skill in the art.

A twist ring 44 is mounted on the lens base 16 and is trapped in place axially by a forward rim 40 (best seen in FIG. 6) of the holder 29. The twist ring 44 extends at least part of the way around the lens base 16. The twist ring 44 is reversibly rotatable relative to the lens base 16 from a rightward configuration through a plurality of intermediate configurations to a leftward configuration. (As with other directional terms herein, the terms "rightward" and "leftward" are used in a relative sense and are not limiting.) The twist ring 44 is mechanically coupled to the traveler 26, such that rotation of the twist ring 44 between the rightward and leftward configurations moves the lens barrel 14 in and out between fully extended and fully retracted positions. It is preferred that the twist ring 44 does not move axially during movement between the rightward and leftward configurations.

The traveler 26 includes a connector 38 that along with parts of the lens base 16 and twist ring 44 provides an extension-retraction mechanism. The connector 38 has three track followers 42. The track followers 42 can be equally spaced about the traveler 26 to help prevent the traveler 26 from canting relative to the lens base 16. Each track follower 42 has a pair of spaced apart posts 42a. The twist ring 44 has an engagement portion 45 that receives the connector 38 of the traveler 26 and constrains of the traveler 26 such that the traveler 26 moves forward and backward along the optical axis 17 when the twist ring 44 is rotated between the rightward and leftward configurations. The engagement portion 45 is a set of internal tracks 46 that each receive one of the track followers 42 of the traveler 26. In the embodiments illustrated herein, the tracks 46 are spiral ribs that extend toward the optical axis from the circumferential wall 47 of the twist ring 44. The tracks 46 are gripped between the posts 42a of the respective track followers 42. Alternatively, tracks 46 can be grooves or pairs of parallel fences that receive track followers 42 configured to ride in the grooves or between the fences.

The track followers 42 extend to the tracks 46 through corresponding slots 43 in the holder 29 of the lens base 16. The slots 43 each extend parallel to the optical axis 17. In the illustrated embodiments, there are three slots 43 and three corresponding track followers 42.

Figure 2:
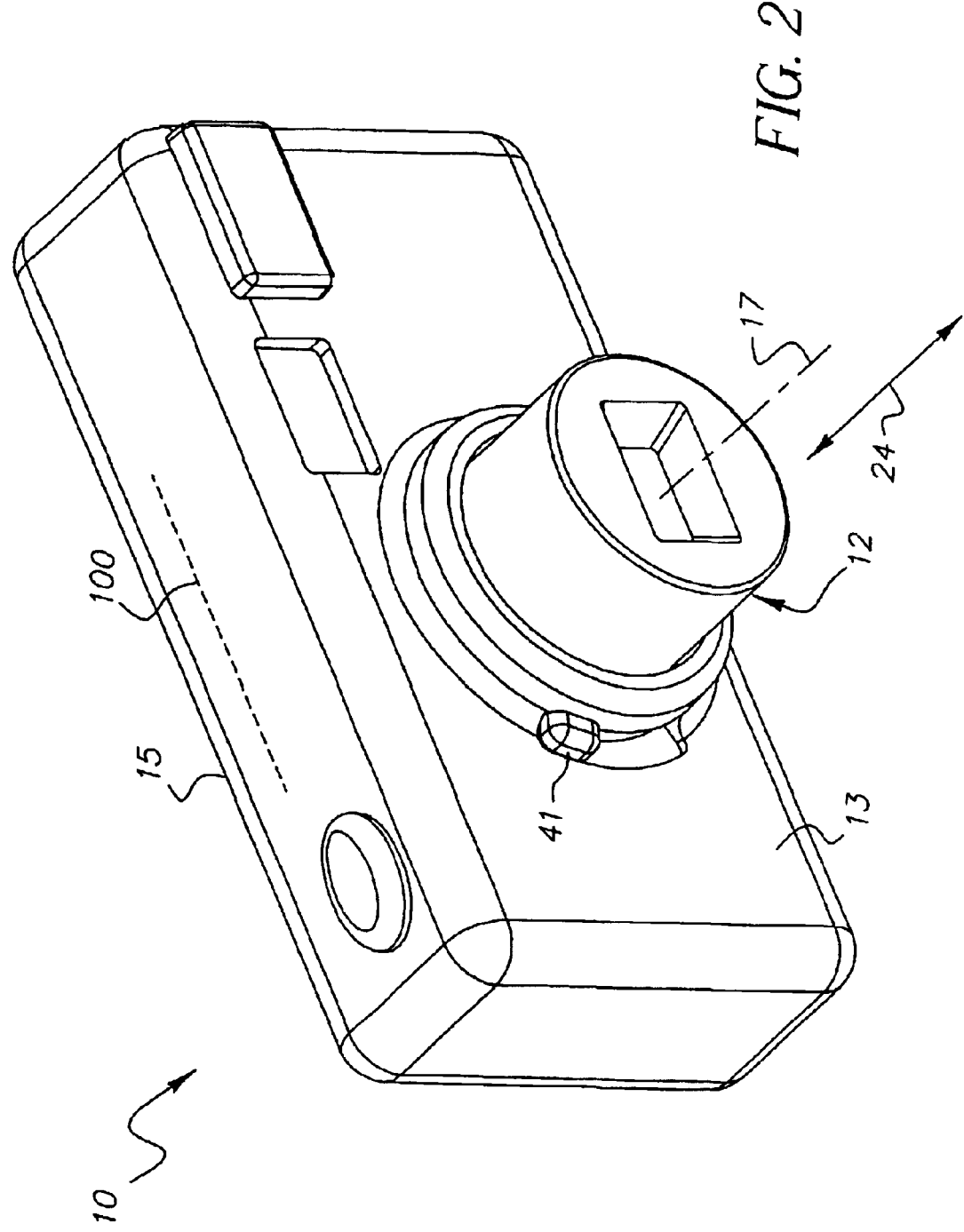
FIG. 2 is a front perspective view of the camera of FIG. 1.
Figure 3:
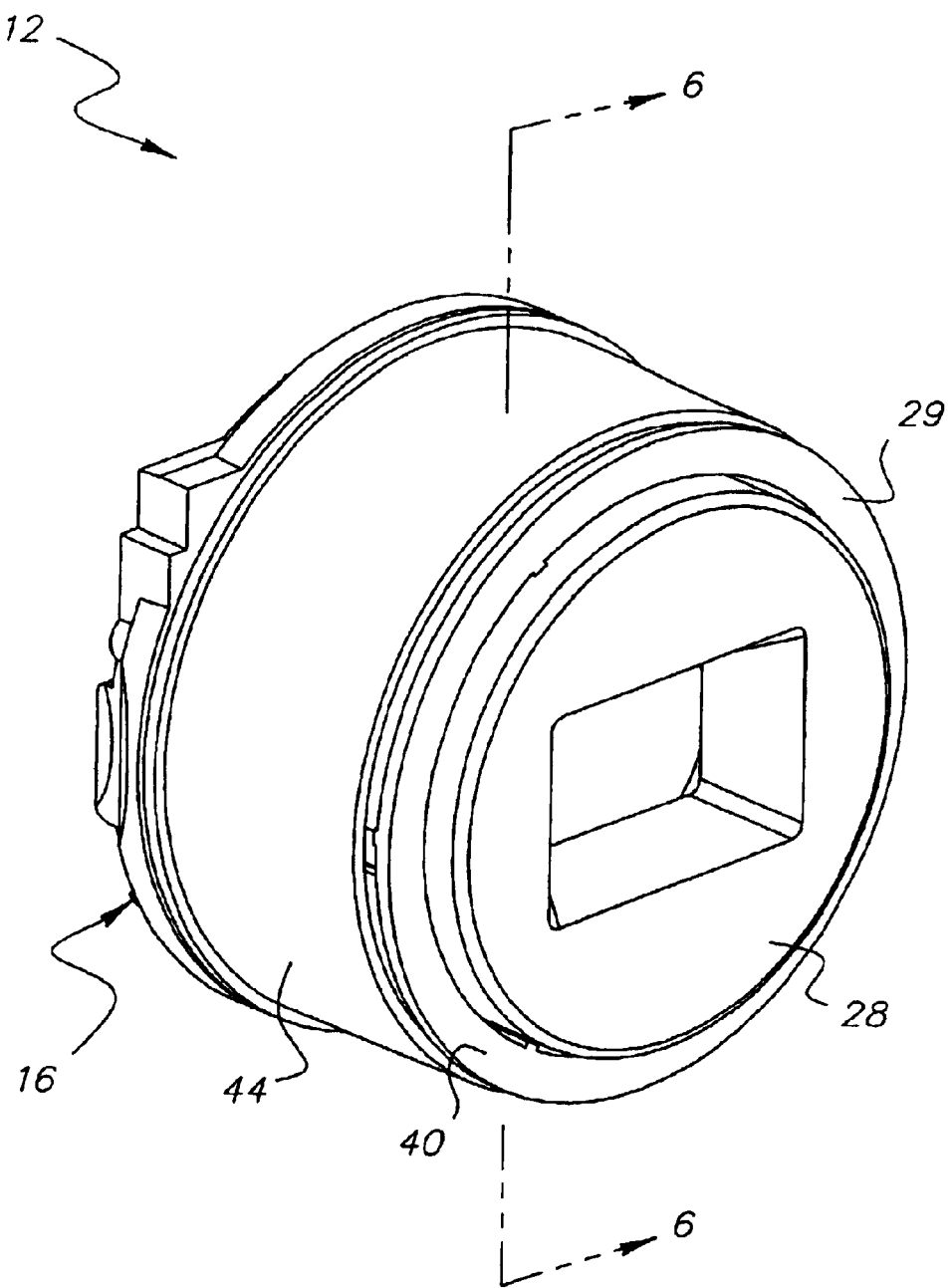
FIG. 3 is a front perspective view of the lens module camera of FIG. 1.
Figure 4:
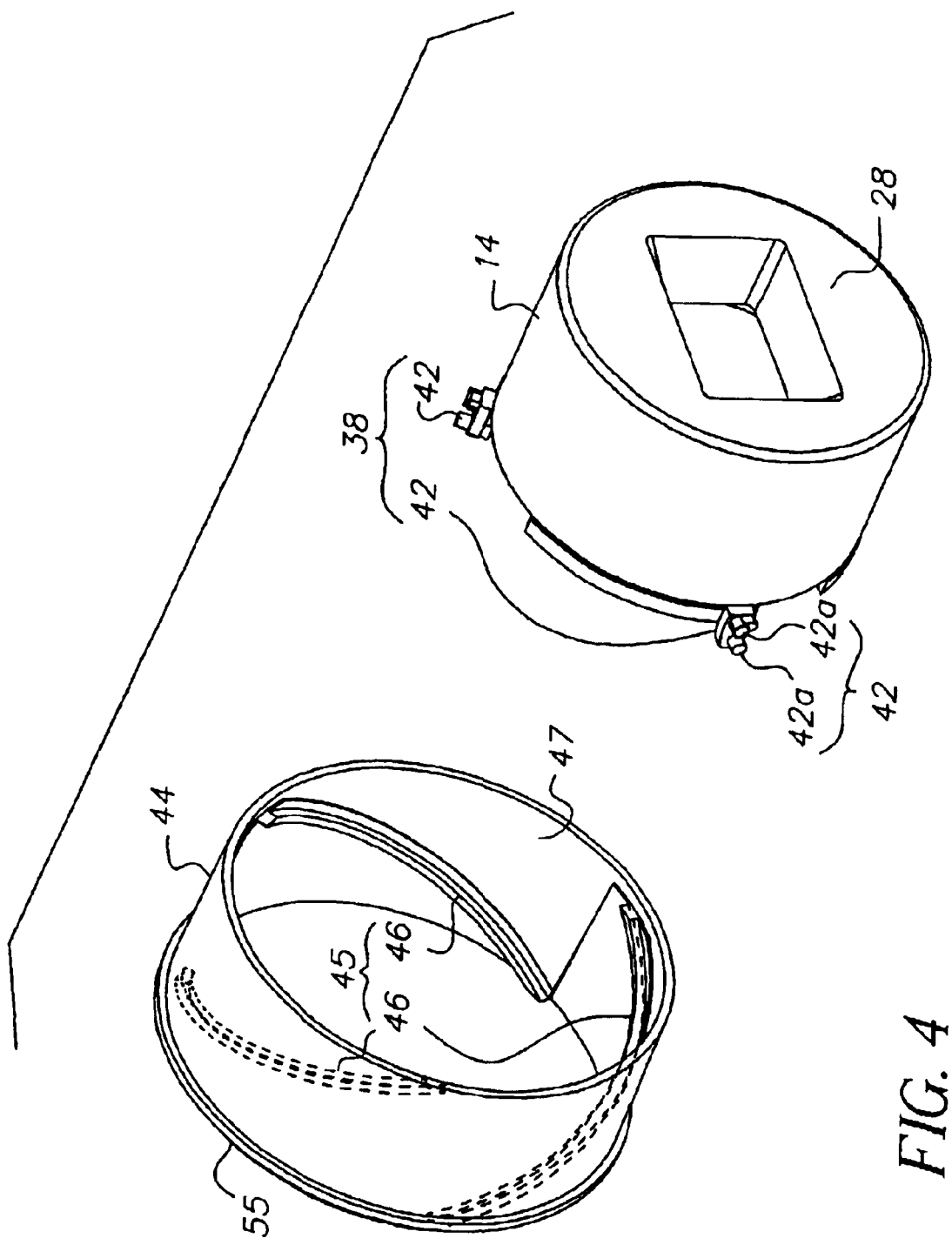
FIG. 4 is a front perspective view of the lens barrel and the twist ring of the camera of FIG. 1.
Figure 5:
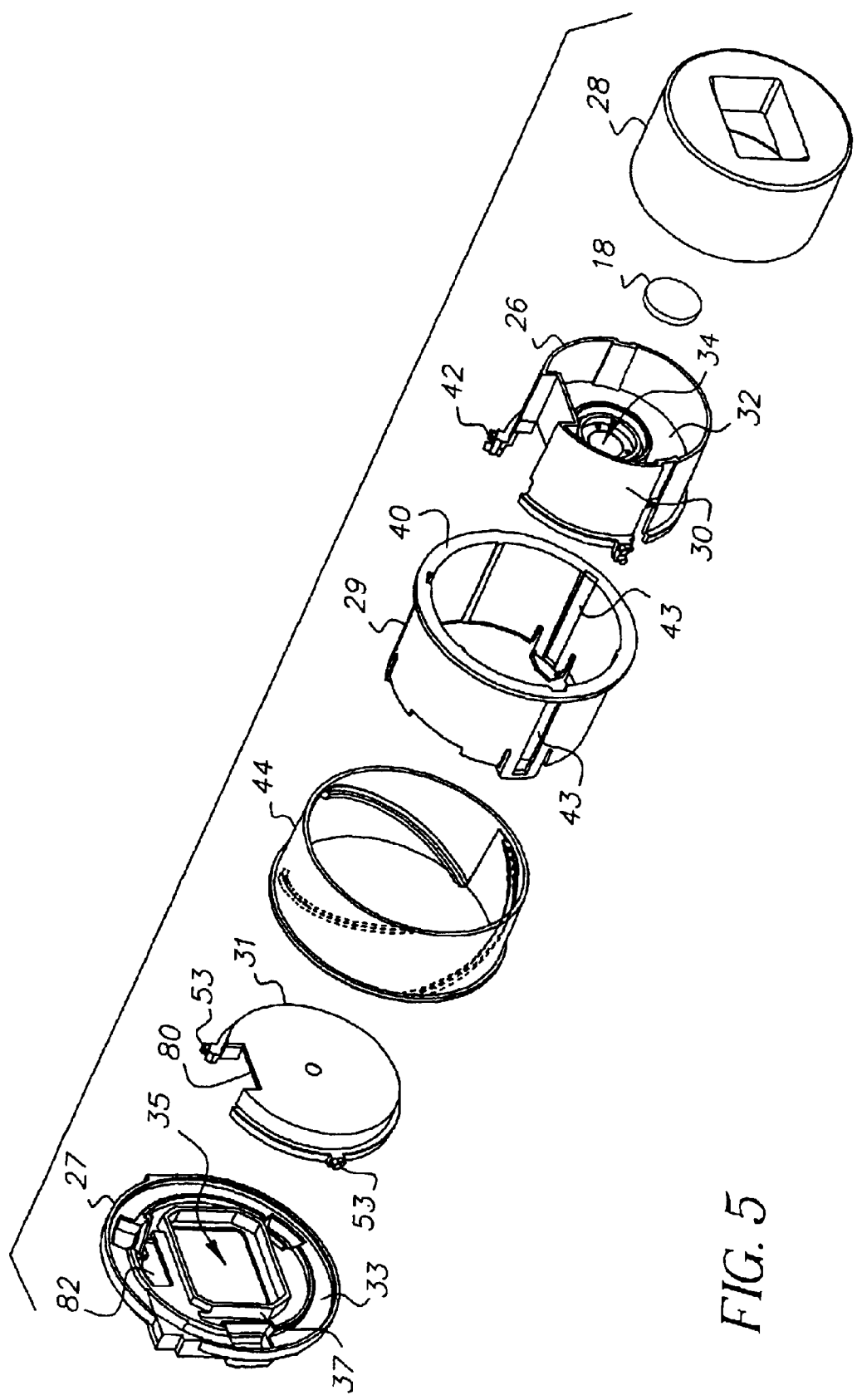
FIG. 5 is a fully exploded, front perspective view of the lens of the camera of FIG. 1.

The track followers 42 slide along the tracks 46 when the twist ring 44 is rotated. Since the track followers 42 are held by the slots 43 of the lens base 16, this results in the lens barrel 14 traversing linearly inward or outward along the optical axis 17. After movement, the traveler 26 is held in a selected position by friction. The lens barrel movement is manually powered by the user rotating the twist ring. Referring to FIGS. 1–2, the twist ring 44 includes a knob 41 that protrudes through a slot in the cover. The knob 41 is moved by the user to rotate the twist ring 44. The lens barrel 14 can alternatively be powered rather than being operated manually.

The engagement portion 45 and corresponding connector 38 can also be changed. For example, the engagement portion 45 and connector 38 can be meshed gears or the equivalent. Other mechanisms for retracting and extending a lens barrel using a twist ring are known to those of skill in the art.

The carrier 31 has a base lens seat 49. The base lens element 21 is seated in the base lens seat 49 and is held in place by a retention ring 51 that if pressed over the base lens seat 49. The base lens element 21 can, alternatively, be fastened or adhered in some other manner. The carrier 31 has pegs 53 that extend outward in the same manner as the track followers 42 of the traveler 26. The pegs 53 are trapped within respective slots 43 of the holder 29 rearward of respective track followers 42. Three pegs 53 are provided on the same basis as the three track followers 42 of the traveler 26.

Figure 6:
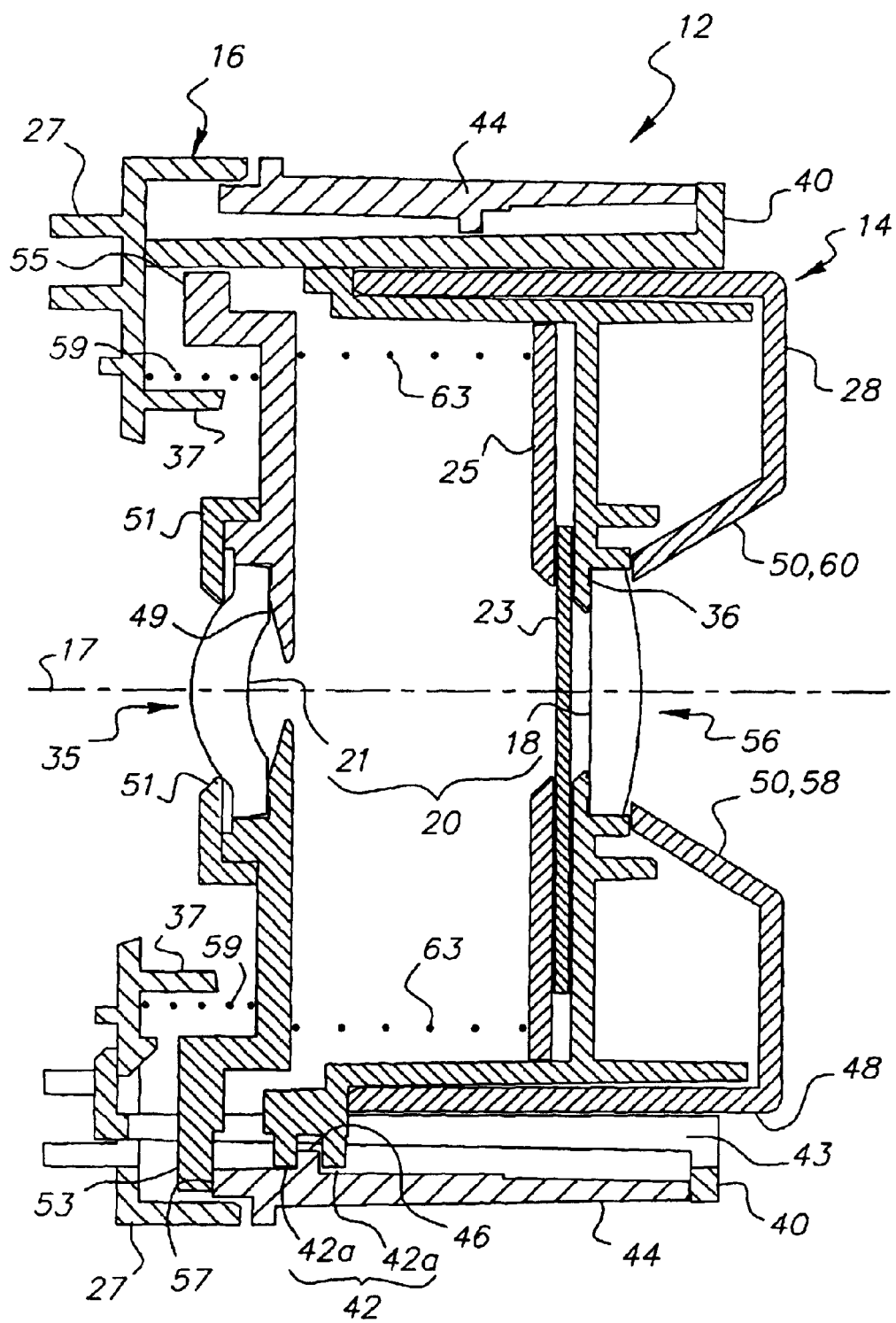
FIG. 6 is a cross-section of the lens of FIG. 3, taken substantially along line 6—6 of FIG. 3. The positions of optional biasing members are indicated by lines of small circles.
Figure 7:
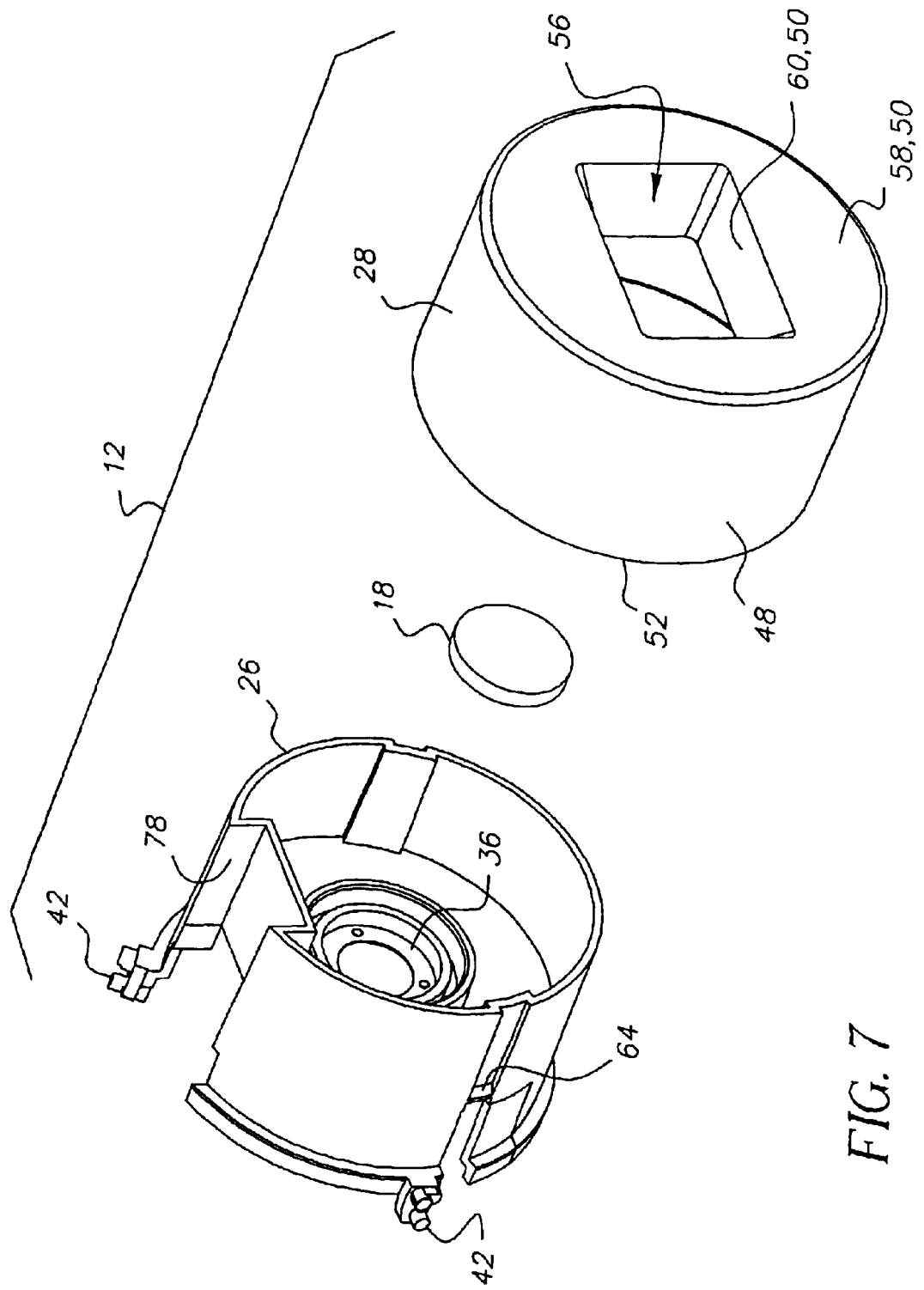
FIG. 7 is an exploded, front perspective view of the lens barrel, of FIG. 3.
Figure 8:
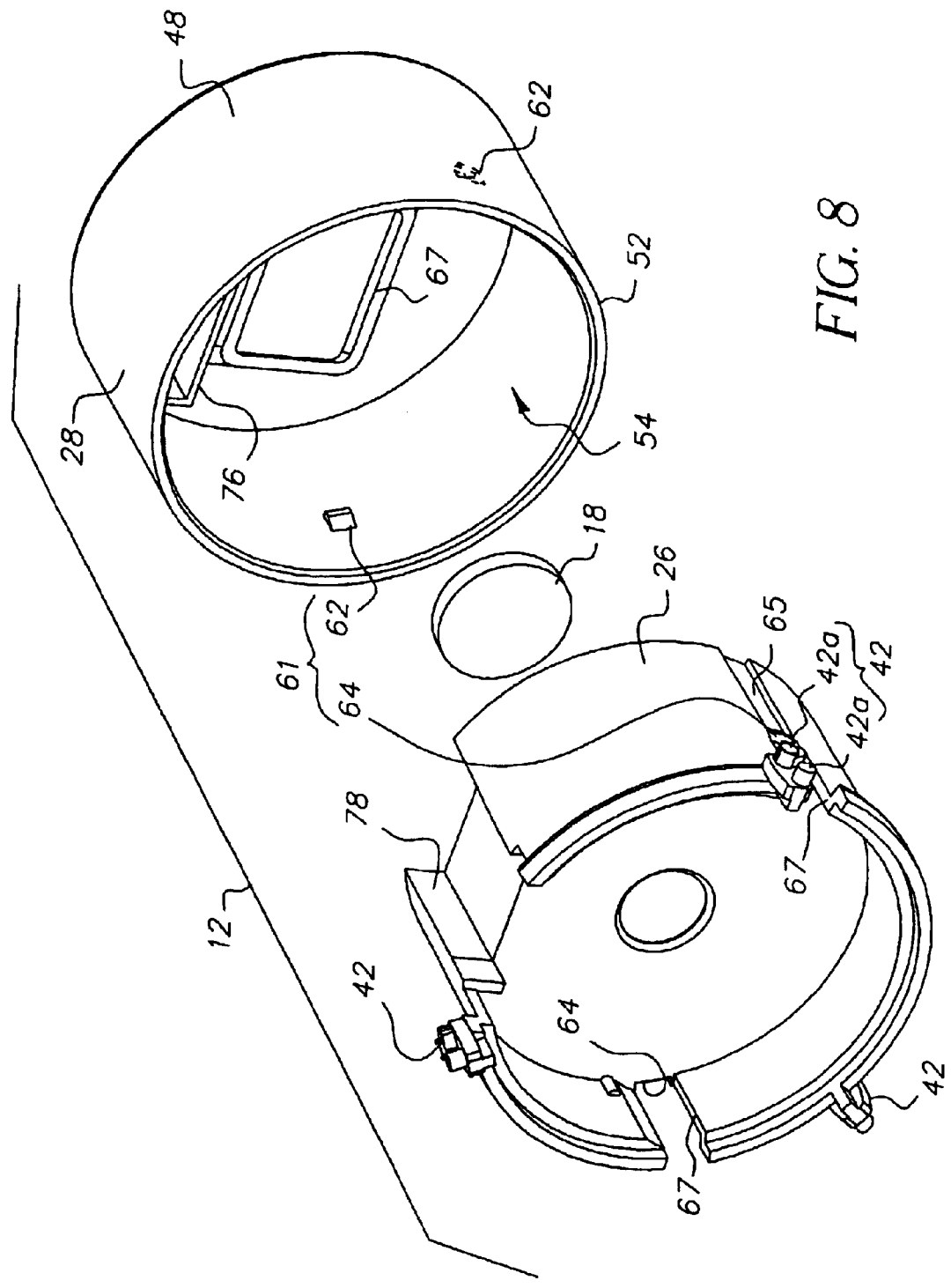
FIG. 8 is an exploded, rear perspective view of the lens barrel of FIG. 3.

The twist ring 44 has a rear margin 55 that is shaped into three cam surfaces 57 (a cam surface is shown in FIG. 6) that face respective pegs 53. When the twist ring 44 is rotated, the pegs 53 move against respective cam surfaces 57. The movement is constrained by the slots 43 of the holder 29, such that the carrier 31 cannot rotate about the optical axis 17.

As shown in FIG. 6, the lens module 12 can, optionally, bias the carrier 31 against the cam surfaces 57 or the traveler 26 against the tracks 46, or both. Biasing of the carrier 31 can be provided, as shown, by inclusion of a compression spring or elastomer member 59 between the carrier 31 and and the mount 27. Biasing of the traveler 26 can be provided, also as shown, by inclusion of a like spring or elastomer member 63 between the traveler 26 or backer 25 and the carrier 31.

The lens base can be modified (not shown) to fix the carrier 31 to the holder 29 or the mount 27. In that case, the cam surfaces and pegs can be eliminated. This approach is simple, but is not useful with taking lenses that require movement of a rear lens element.

The lens barrel 14 includes the barrel cap 28 that is mounted on the front of the traveler 26. The barrel cap 28 is cup-shaped with a circumferential side wall 48 and a front wall 50 that is continuous with the side wall 48 at one end. One or both of the barrel cap 28 and the traveler 26 have blocking features that prevent rotation of the barrel cap about the optical axis, relative to the traveler. In the illustrated embodiments, the blocking feature of the barrel cap is a roughly rectangular plate-shaped protrusion 76 (best seen in FIG. 8) that fits in a notch 78 in the outer surface of the traveler 26. In these embodiments, the carrier 31 and mount 27 also have respective cut-outs 80,82 that receive the protrusion 76, when the lens barrel 14 is fully retracted.

The barrel cap 28 has a brim 52 that faces the lens base 16. The brim 52 surrounds a cap rear opening 54. In the illustrated embodiment, the brim 52 is circular. The brim 52 can be other shapes, such as oval or rectangular. Opposite the rear opening 54 is a cap front opening 56 in the front wall 50. In the embodiment shown in the figures, the front opening 56 is rectangular in cross-section and the front wall 50 has a front facing main portion 58 and an entry portion 60 that matches the cross-section of the front opening 56 and extends inward parallel to the optical axis 17. The entry portion 60 is continuous with the main portion 58. The configuration of the front opening 56 and entry portion 60 can be varied. For example, the front opening 56 can be round and the entry portion 60 tapered. The front opening 56 and the entry portion 60 are, preferably, matched to the taking lens system 20 and to the shape of the image plane in the camera 10, so as to avoid vignetting.

In the embodiment shown in the figures, the side wall 48 of the barrel cap 28 extends back along the entire longitudinal length of the main part of the traveler 26. This provides protection for the traveler 26 during use when the lens barrel 14 is extended beyond the front cover 13 and when the front cover 13 of the camera 10 has been removed during recycling.

The rear margin 67 of the entry portion 60 of the front wall 50 of the barrel cap 28 retains the front lens element 18 in the lens seat 36 of the traveler 26, in alignment with the other elements of the taking lens system 20. The barrel cap 28 can be snapped off the traveler 26 to remove the front lens element 18 for cleaning or replacement. This is particularly advantageous for one-time use cameras, in which the front lens element 18 needs to be cleaned or replaced prior to reuse. The barrel cap 28 can be cleaned or replaced at the same time. This replacement, along with replacement of the covers of the body, restores the appearance of the camera 10.

The snap fit of the barrel cap 28 on the traveler 26 provides for quick and easy removal and replacement of the barrel cap 28. The barrel cap 28 can also have a simple, easy to mold shape. This reduces costs. In the embodiment shown in the figures, the barrel cap 28 has a pair of snaps 61. Each snap 61 has a lug 62 that is molded into the barrel cap 28 itself. The other part of each snap 61 is an engagement surface 64 of the traveler 26. The engagement surfaces 64 are shelves formed in the outside wall 30 of the traveler. The lugs 62 lodge against respective engagement surfaces 64 when the barrel cap 28 is installed. The traveler 26 has axially extending recesses 65 leading rearward to the engagement surfaces 64 and cut-outs extending rearward from the engagement surfaces 67. The opposed snaps 61 requires only limited flexure of the barrel cap 28 for attachment and detachment and, thus, permit a relatively tight fit between the barrel cap 28 and the traveler 26. The snap lugs 62 are spaced from the brim 52 of the barrel cap 28 and from the front opening 56. This provides for relatively greater strength, than if the lugs 62 were provided at the brim 52 or front opening 56 of the barrel cap 28.

Figure 9:
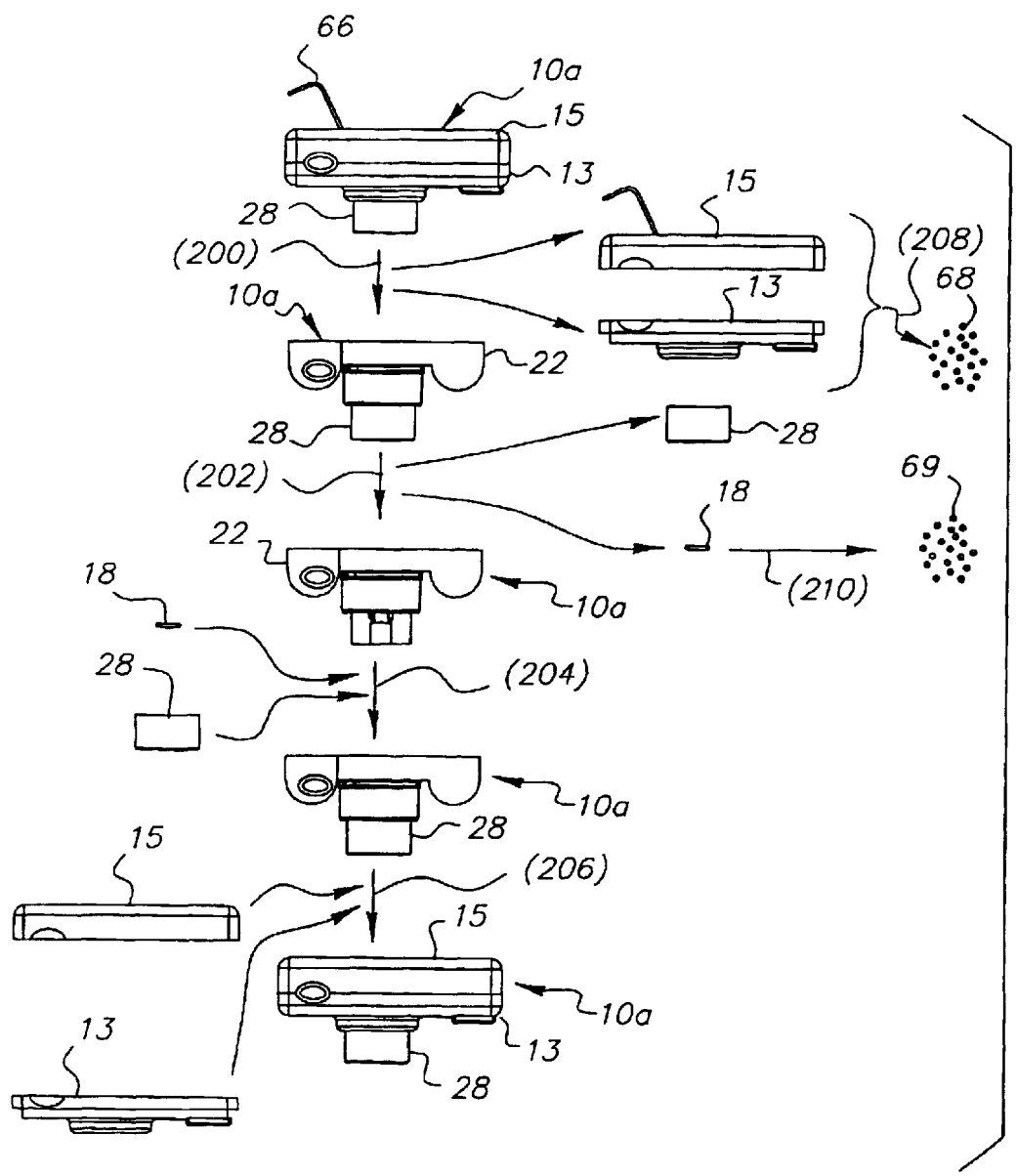
FIG. 9 is a diagrammatical view of the method of the invention.

FIG. 9 illustrates a method for restoring a used one-time-use camera frame assembly 10a that incorporates the extendable lens module 12. A used camera frame assembly or carcass 10a is received from a photofinisher. The used camera frame assembly 10a does not include a film unit (not shown). A battery (not illustrated) may also have been removed. In FIG. 9, the camera frame assembly 10a is shown with a portion 66 of the back cover 15 positioned at an angle to the remainder of the back cover 15. This condition is typical for many one-time-use cameras at this stage in recycling, since the back cover 15 is bent open to remove the film unit.

In FIG. 9, the front and rear covers 13,15 are initially removed (200) from the camera frame assembly 10a. The barrel cap 28 is next snapped off (202) the traveler 26 of the lens barrel 14. This removal is illustrated as occurring after removal of the covers 13,15, but can also occur before removal (200) of the covers 13,15. In the illustrated cameras, removal (202) of the barrel cap 28 is independent of the removal (200) of the front cover 13. The camera 10 can be modified to require removal of barrel cap and cover or covers in a particular order.

The removal of the barrel cap 28 releases the front lens element 18 from the lens seat 36 of the traveler 26. The front lens element 18 is then freely movable and will not stay in place unless held in position by gravity or something that blocks movement, such as a tool (not shown). The used front lens element 18 can be dropped out or lifted out for replacement.

At a later stage, a replacement front lens element 18 is placed in the lens seat 36 and the lens barrel 14 is recapped (204) by snapping a replacement barrel cap 28 on the traveler 26. The front and rear covers 13,15 are installed (206) over the frame 22 of the camera 10 to provide the finished camera 10. As earlier noted, removal and replacement of front and rear covers 13,15 is independent of the removal and replacement of the barrel cap 28.

In a particular embodiment, the used front and rear covers 13,15 and barrel cap 28 are replaced with new front and rear covers 13,15 and barrel cap 28. Instead of use of new parts, used parts can be inspected and cleaned and replaced on the camera frame assembly 10a. Placement can occur without cleaning and inspection, however, this is undesirable as it is likely to lead to large numbers of recycled cameras having defects.

If new parts are used for the covers 13,15 and barrel cap 28, then the used front and rear covers 13,15 and barrel cap 28 can be recycled as feedstock for the molding of camera parts or other items. The covers 13,15 and barrel cap 28 can be composed of materials that permit production of particular parts. In that case, the covers 13,15 and barrel cap 28 are ground or otherwise reduced (208) to a convenient size (indicated by pellets 68 in FIG. 8) and then remelted. The barrel cap 28 and covers 13,15 can be made of polymer-polymer blend compatible thermoplastics. This permits reuse together of different materials, if required proportions in the feedstock are met. Alternatively, the barrel cap 28 and covers can be made of the same thermoplastic. This has the advantage that proportions of the different parts in a particular feedstock do not have to be analyzed and adjusted. The front lens element 18 can also be ground or otherwise reduced (210) to a convenient size (indicated by pellets 69 in FIG. 9) and then remelted. The lens element 18 feedstock is typically recycled used as filler.

Figure 10:
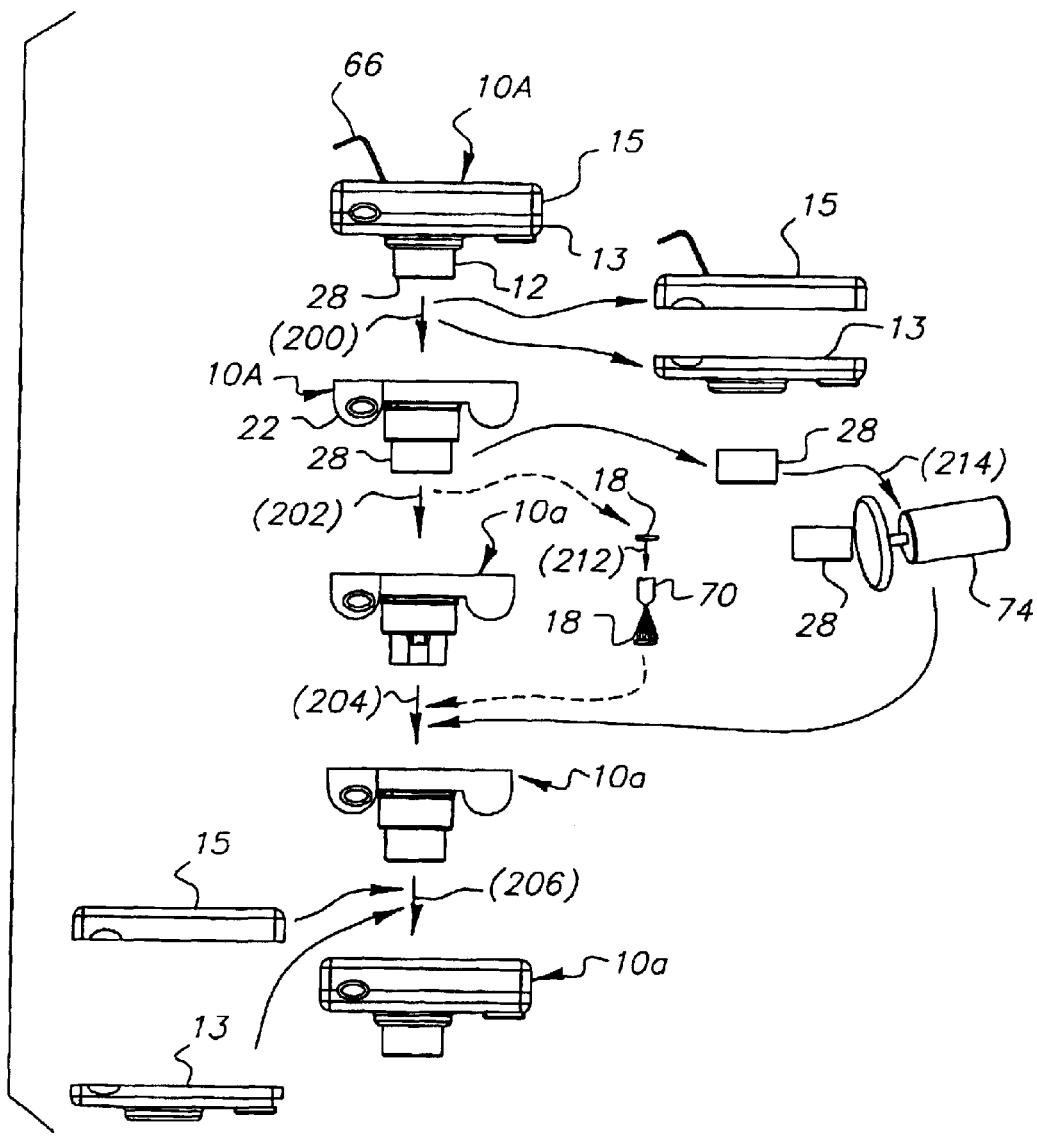
FIG. 10 is a diagrammatical view of another embodiment of the method of the invention.

FIG. 10 illustrates a modification of the method. Steps are generally as described in relation to FIG. 9, but more components are reused. In one step, indicated in dashed lines, the used front lens element 18 is cleaned (212) (indicated by a spray of cleaning material emerging from a nozzle 70) and the front lens element 18 is then reused. The front lens element 18 can be removed from the traveler 26 for cleaning or can be retained in the traveler 26 during inspection and cleaning. During this process, the front lens element 18 can be held in place in the lens seat 36 or can be moved out and then reseated and subsequently held in place. The front lens element 18 can be held in place, with reseating as necessary, but without cleaning or inspection or both. This latter approach is not preferred, since the risk of defective cameras is increased.

In another step, the barrel cap 28 is cleaned as necessary (not separately illustrated) and refinished (214) and is then reused. The refinishing is illustrated in FIG. 10, as a grinder 74. Grinding and polishing can be used to remove scratches, imperfections, and the like from the used barrel cap 28. After this step, the renewed barrel cap 28 can be placed on the traveler 26.

The invention has been described in detail with particular reference to certain preferred embodiments thereof, but it will be understood that variations and modifications can be effected within the spirit and scope of the invention.

What is claimed is:

1. A method for restoring an existing used one-time-use camera frame assembly comprising the steps of:

snapping a barrel cap of said assembly off a traveler of said assembly;

holding a lens element of said assembly in a lens seat of said traveler, following said snapping; and recapping said traveler, during said holding.

2. The method of claim 1, wherein said recapping further comprises placing a replacement barrel cap on said traveler.

3. The method of claim 1 further comprising seating said lens element in said lens seat, prior to said holding.

4. The method of claim 3 wherein said snapping further comprises releasing a used lens element from said lens seat and said seating further comprises placing a replacement lens element in said lens seat following said releasing.

5. The method of claim 1 further comprising removing a front cover of said assembly, said removing being independent of said snapping.

6. The method of claim 1 further comprising refinishing said barrel cap after said snapping to provide a renewed end cap and wherein said recapping further comprises placing said renewed barrel cap on said traveler.

7. The method of claim 6, further comprising removing a front cover of said assembly, said removing being independent of said snapping.

8. A method for restoring an existing used one-time-use camera frame assembly comprising the steps of:

snapping a barrel cap of said assembly off a traveler of said assembly;

concurrent with said snapping, releasing a lens element of said assembly from a lens seat in said traveler;

following said snapping and releasing, holding said lens element in said lens seat;

following said snapping, refinishing said barrel cap to provide a renewed end cap; and following said refinishing and during said holding, placing said renewed barrel cap on said traveler.

9. A method for restoring an existing used one-time-use camera frame assembly comprising the steps of:

snapping a barrel cap off a movable traveler of said assembly to free a lens element in a lens seat of said traveler, the traveler being axially movable with said lens element along an optical axis of the lens element;

holding said lens element in the lens seat of said traveler, following said snapping; and recapping said traveler, during said holding.

10. A method for restoring an existing used one-time-use camera frame assembly comprising the steps of:

snapping a barrel cap off a movable traveler of said assembly to free a lens element in a lens seat of said traveler, the traveler being axially movable with said lens element along an optical axis of the lens element;

concurrent with said snapping, releasing said lens element from the lens seat in said traveler;

following said snapping and releasing, holding said lens element in said lens seat;

following said snapping, refinishing said barrel cap to provide a renewed end cap; and following said refinishing and during said holding, placing said renewed barrel cap on said traveler.

* * * * *